(12) United States Patent
Springer et al.

(10) Patent No.: US 12,302,922 B2
(45) Date of Patent: *May 20, 2025

(54) FROZEN PRODUCT MACHINE

(71) Applicant: Steuben Foods, Inc., Elma, NY (US)

(72) Inventors: Lindsay Springer, West Seneca, NY (US); Robert J. Susz, Caledonia, NY (US); Ray Dudenhoeffer, Buffalo, NY (US); Donkeun Park, Henrico, VA (US); Don Yuhong Park, Henrico, VA (US); Dov Glucksman, Winchester, MA (US)

(73) Assignee: Steuben Foods, Inc., Elma, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/376,306

(22) Filed: Oct. 3, 2023

(65) Prior Publication Data
US 2024/0023572 A1 Jan. 25, 2024

Related U.S. Application Data

(63) Continuation of application No. 17/387,839, filed on Jul. 28, 2021, now Pat. No. 11,805,789.
(Continued)

(51) Int. Cl.
| | |
|---|---|
| *A23G 9/04* | (2006.01) |
| *A23G 9/22* | (2006.01) |
| *A23G 9/28* | (2006.01) |
| *B01F 27/1143* | (2022.01) |
| *B01F 101/13* | (2022.01) |

(52) U.S. Cl.
CPC ............. *A23G 9/224* (2013.01); *A23G 9/045* (2013.01); *A23G 9/228* (2013.01); *A23G 9/281* (2013.01); *B01F 27/1143* (2022.01); *B01F 2101/13* (2022.01)

(58) Field of Classification Search
CPC ........ A23G 9/224; A23G 9/045; A23G 9/228; A23G 9/281; B01F 27/1143; B01F 2101/13
See application file for complete search history.

(56) References Cited

U.S. PATENT DOCUMENTS

| | | | | |
|---|---|---|---|---|
| 4,502,377 | A * | 3/1985 | Hall, Jr. .................. | A23G 9/28 366/601 |
| 2021/0246888 | A1* | 8/2021 | Hartung-Rey .......... | F04B 15/02 |
| 2024/0099486 | A1* | 3/2024 | Smith, III .............. | A23G 9/045 |

\* cited by examiner

*Primary Examiner* — Miguel A Diaz
(74) *Attorney, Agent, or Firm* — The Law Office of Vincent LoTempio, PLLC; David T. Stephenson; Vincent G. LoTempio

(57) ABSTRACT

A frozen product machine that solves problems associated with conventional home ice cream and frozen product machines by prevents loss of product in the chamber and decreases freezing time for a liquid product. A cooling chamber is cooled by a cooling element that provides variable cooling temperatures throughout the cooling chamber. A temperature gradient, progressing from lower temperatures at the bottom of the chamber, or the outlet, to higher at the top of the chamber, or inlet, create a more efficient means of cooling a frozen product. An auger, that may be shaped to match the shape of the cooling chamber may include slots that allow for controlled flow of frozen product through the chamber to promote efficient cooling.

(Continued)

Hinged fins may rotate from open to closed within the slot to further enhance flow of frozen product through the frozen product machine.

19 Claims, 11 Drawing Sheets

Related U.S. Application Data

(60) Provisional application No. 63/057,781, filed on Jul. 28, 2020.

FROZEN PRODUCT MACHINE

TECHNICAL FIELD

The present disclosure relates to a device and method for the domestic preparation of soft frozen food and frozen beverage products, in particular, ice cream, smoothies, frozen yogurt, sorbet, gelato, milkshakes, iced drinks and other similar frozen products.

BACKGROUND

Frozen food and drinks have recently been growing in popularity. While ice cream has been popular for centuries, smoothies, iced coffee and lattes, frozen yogurt as well as other frozen products have now become part of mainstream consumption. The demand for domestic production of various kinds of food and drinks in the kitchen has also grown rapidly. Additionally, the demand for countertop cooking devices that can make healthy food quickly has seen tremendous growth. To date, no machine capable of efficiently producing a wide variety of frozen products on a kitchen countertop has been developed. A need exists for a countertop machine that makes frozen products, such as soft serve ice cream, that have conventionally been limited to commercial production.

Soft serve ice cream has been bringing people out to the ice cream shop for decades. In 1934, Thomas Carvel sold the first soft serve ice cream when his ice cream truck got a flat tire outside of New York City, forcing him to sell his product before it melted. Within two days he had sold all of his ice cream and customers loved it, leading Carvel to design and patent a soft serve ice cream machine. U.S. Pat. No. 2,491,852, to Thomas Carvel, was directed to a soft serve ice cream machine. Carvel's machine included a cooling chamber in the form of a long cylinder, a propeller and scraper blades with which to mix and scrape the frozen ice cream from the sides of the chamber, and a nozzle for dispensing the product. This machine, and soft serve ice cream, helped the Carvel to achieve the American dream and create a product that is just as popular today as it was seventy years ago.

Various types of commercial ice cream and soft ice cream machines have been produced since 1940, however, the core features have remained relatively constant. A cooling chamber, an auger, and a nozzle for dispensing are all elements of machines being produced today. Preparation of ice cream involves mixing of ingredients and adding gas or air into the mixture (sometimes a by-product of the mixing itself) in order to soften the texture of the mixture and cooling of the mixture. At present, however, as was true fifty years ago, the majority of ice creams are produced in an industrial process. In this process, ice cream is produced in large volumes and then separated into packages of various sizes and shipped and sold as such to end users.

More recently, kitchen countertop soft ice cream machines have become more common. Due to increased demand for food products made at home, improved technology and the advent of low-cost components, home soft serve ice cream machines are gaining in popularity. Machines for domestic preparation of ice cream are available online and in large chain home products stores, allowing the user to prepare ice cream from a mixture of edible ingredients of his liking at home.

In conventional domestic ice cream, or frozen product, machines, the user prepares a mix made of pre-prepared or selected ingredients and introduces the mix into the machine which then cools the mix while mixing. Some machines have a built-in cooling system while others only perform mixing, wherein the user is required to transfer the mix, or the machine itself, into a freezer.

Drawbacks of the existing machines include slow freezing times, loss of product in cooling chambers, and slow and ineffective cleaning. Therefore, it is clear that improvements in the domestic ice cream machine, or frozen product machine, are needed. Providing single serve portions of frozen dessert/beverages at a rapid speed. With existing machines, limited cooling capacity results in ice crystals that are too large. Further, existing machines mix at a slower than optimal rate, causing inadequate air incorporation and fat separation.

Thus, it is clear that a low volume, rapidly freezing, single serving frozen product machine that offers a dispensing mechanism similar to commercial soft serve machines is needed.

SUMMARY

The present disclosure solves the problems associated with conventional home ice cream and frozen product machines by providing a machine that prevents loss of product in the chamber and decreases freezing time for a liquid product, which may be a frozen food or drink mix. The present disclosure includes a vertically oriented conical cooling chamber. An auger matching the shape of the chamber mixes the ice cream product as it cools. The frozen product machine of the present disclosure may be used to dispense ice creams, smoothies frozen yogurts, sorbets, milkshakes, iced drinks and other similar frozen products. In some embodiments, the food or beverage product produced according to the present disclosure may be cooled rather than frozen.

The present disclosure includes a reversible motor, thereby providing a mixing mode in one rotational direction and a dispensing mode in a second rotational direction. The reversible motor directs the auger to turn counterclockwise or clockwise, such that a first rotational direction promotes a lifting of the product during mixing. A second rotational direction of the auger promotes dispensing of the product once it has been sufficiently cooled. The cooling chamber is in contact with a cooling element, which may also be referred to as a cooling mechanism or cooling system, which may in some embodiments include a refrigerant flowing through a compressor and evaporator coil. The evaporator coil may have an increased coil density at certain regions of the chamber. In one embodiment, the increased density of the evaporator coil 24 in the lower portion of the chamber generates an increased cooling capacity in this region. In some embodiments, evaporator coil 24 density may also be increased around nozzle 14 to provide increased cooling during dispensing. This configuration of evaporator coil 24 may contribute to a decrease in the amount of time necessary for sufficient cooling and dispensing of the frozen product.

During the cooling process, the liquid product becomes a combined liquid and solid frozen substance, a combination which is herein referred to as a frozen product. Directing the liquid component to the coldest part of the cooling chamber for freezing may promote freezing of the liquid portion. The liquid portion of the frozen product may be directed to the bottom of the cooling chamber through the placement of slots within the auger. The slots may be designed to separate the liquid from the solid portion of the mix and allow the liquid to flow downward more efficiently under the influence of gravity to the bottom of the chamber. Thus, cooling of the product may be accelerated and the wait time for the consumer reduced.

Additionally, during the process of the present disclosure, ice crystal size and incorporation of air into the frozen product may be achieved without breaking the oil emulsion. The process of the present disclosure may facilitate optimal ice crystal size while maintaining a delicate balance of organic components in the frozen product. During cleaning, the frozen product machine may be set to mixing mode, will direct a cleaning solution in the chamber to all parts of the machine that come in contact with the frozen product, thereby thoroughly cleaning and disinfecting the machine.

Preferably, a temperature differential is generated in the cooling chamber by the cooling element.

Preferably, the auger contains slots.

Preferably, the auger slots may be closed by hinged fins.

Preferably, a sensor module monitors speed of a motor driving the one or more augers for detecting the hardness measure of the frozen product.

Preferably, the sensor module monitors input power of a motor driving the one or more rotatable auger for detecting the hardness measure of the frozen product. More preferably, the processor module receives the signal indicative of the input power to operate a regulator for maintaining a constant motor speed.

Preferably, the sensor module monitors input current of a motor driving the one or more rotatable auger for detecting the hardness measure of the frozen product. More preferably, the processor module receives the signal indicative of the input current to operate a regulator for maintaining a constant motor speed.

Preferably, the sensor module monitors temperature of the frozen product for detecting the hardness measure of the frozen product.

Preferably, the difference of the signal over time is indicative of a hardness level of the frozen product.

Preferably, after the frozen product has reached a selected hardness, the processor module periodically operates the one or more augers to mix the frozen product to substantially maintain the frozen product at the selected hardness.

Preferably, after the frozen product has reached a selected hardness, the processor module periodically operates the cooling element to substantially maintain the frozen product at the selected hardness.

Preferably, the processor operates a cooling element for a predetermined time period before indicating to a user to introduce the mixture to the cooling chamber.

According to an aspect of the invention there is provided a device for making a frozen product, the device comprising:
 an auger;
 a cooling chamber for containing an frozen product, the cooling chamber being associated with a cooling element for cooling the frozen product;
 a processor module being adapted to control the operation of the auger;
 wherein, after the frozen product has reached a selected hardness, the processor module periodically operates the auger to churn the frozen product to substantially maintain the frozen product at the selected hardness.

Preferably, the cooling element periodically operates to substantially maintain the frozen product at the selected hardness.

Preferably, the device further comprises a sensor module for detecting a hardness measure of the frozen product; the processor module being coupled to the sensor module for receiving a signal indicative of the hardness measure.

Preferably, the sensor module monitors speed of a motor driving the auger for detecting the hardness measure of the frozen product.

Preferably, the sensor module monitors input power of a motor driving the auger for detecting the hardness measure of the frozen product. More preferably, the processor module receives the signal indicative of the input power to operate a regulator for maintaining a constant motor speed.

Preferably, the sensor module monitors input current of a motor driving the auger for detecting the hardness measure of the frozen product. More preferably, the processor module receives the signal indicative of the input current to operate a regulator for maintaining a constant motor speed.

Preferably, the sensor module monitors temperature of the frozen product for detecting the hardness measure of the frozen product.

Preferably, the difference of the signal over time is indicative of a hardness levels of the frozen product.

According to an aspect of the invention there is provided a device for making dessert, the device comprising:
 a body having at least one auger;
 a cooling chamber associated with a cooling element;
 a processor module being adapted to control the operation of the auger;

Preferably, a motorized drive train for operating the auger is located adjacent the cooling chamber.

Preferably, a cap is located above the cooling chamber.

Preferably, the device include a user interface for enabling user selection of a frozen product type, the user selection being used to configure the operation of the auger and to control torque applied to the auger.

Preferably, the device includes a temperature sensing element for indicating the temperature of the mixture.

BRIEF DESCRIPTION OF THE DRAWINGS

Preferred embodiments of the present invention will now be described, by way of example only, with reference to the attached figures, wherein.

DETAILED DESCRIPTION

In the following description, the various embodiments of the present disclosure will be described in detail. However, such details are included to facilitate understanding of the invention and to describe exemplary embodiments for implementing the invention. Such details should not be used to limit the invention to the particular embodiments described because other variations and embodiments are possible within the scope of the invention.

Furthermore, although numerous details are set forth in order to provide a thorough understanding of the present invention, it will be apparent to one skilled in the art that these specific details are not required in order to practice the present invention. In other instances, details such as well-known methods, types of data, protocols, procedures, components, networking equipment, processes, interfaces, electrical structures, circuits, etc. are not described in detail.

The present disclosure relates to an apparatus and method for producing soft serve ice cream and other frozen food and beverage products. Appropriate texture and improved function are achieved through a number of novel features. Optimal ice crystal size and incorporation of air may be achieved without breaking the oil emulsion. The system may facilitate optimal ice crystal size while maintaining a delicate balance of organic components of the frozen product.

Figure 1:
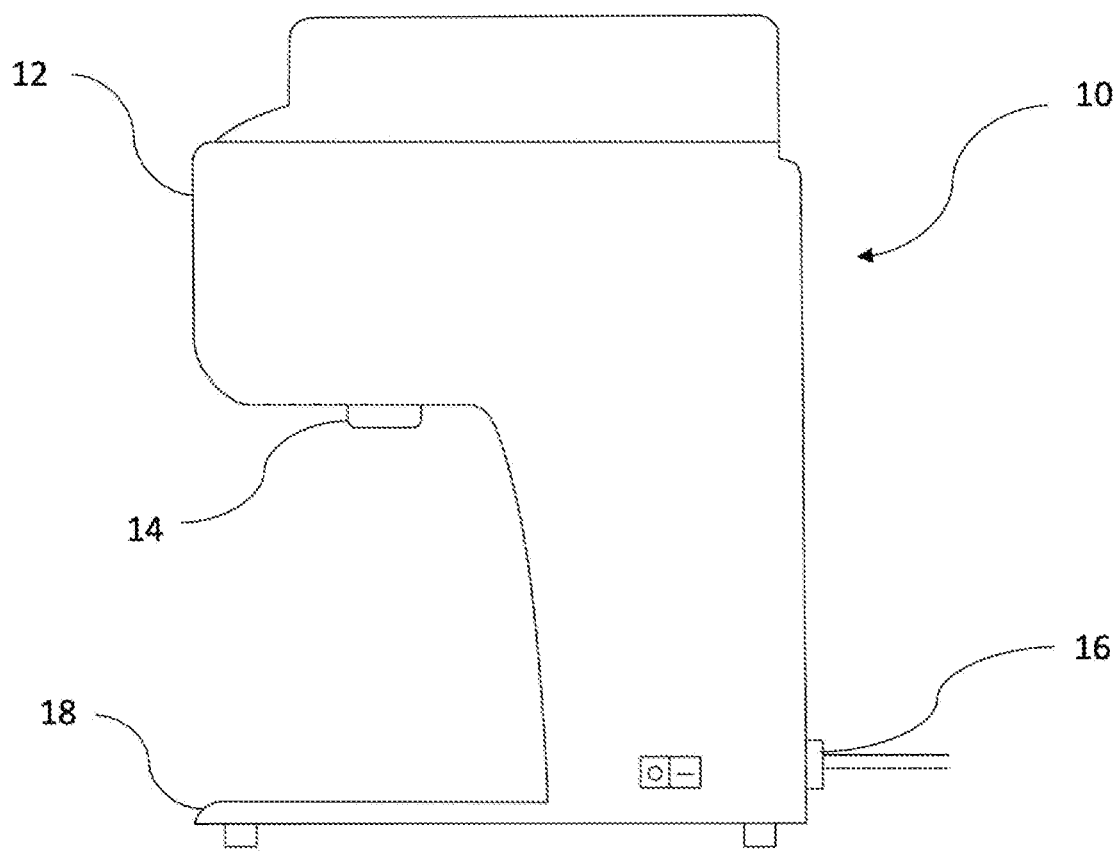
FIG. 1 shows a side view of the apparatus in accordance with the present disclosure.
Figure 2:
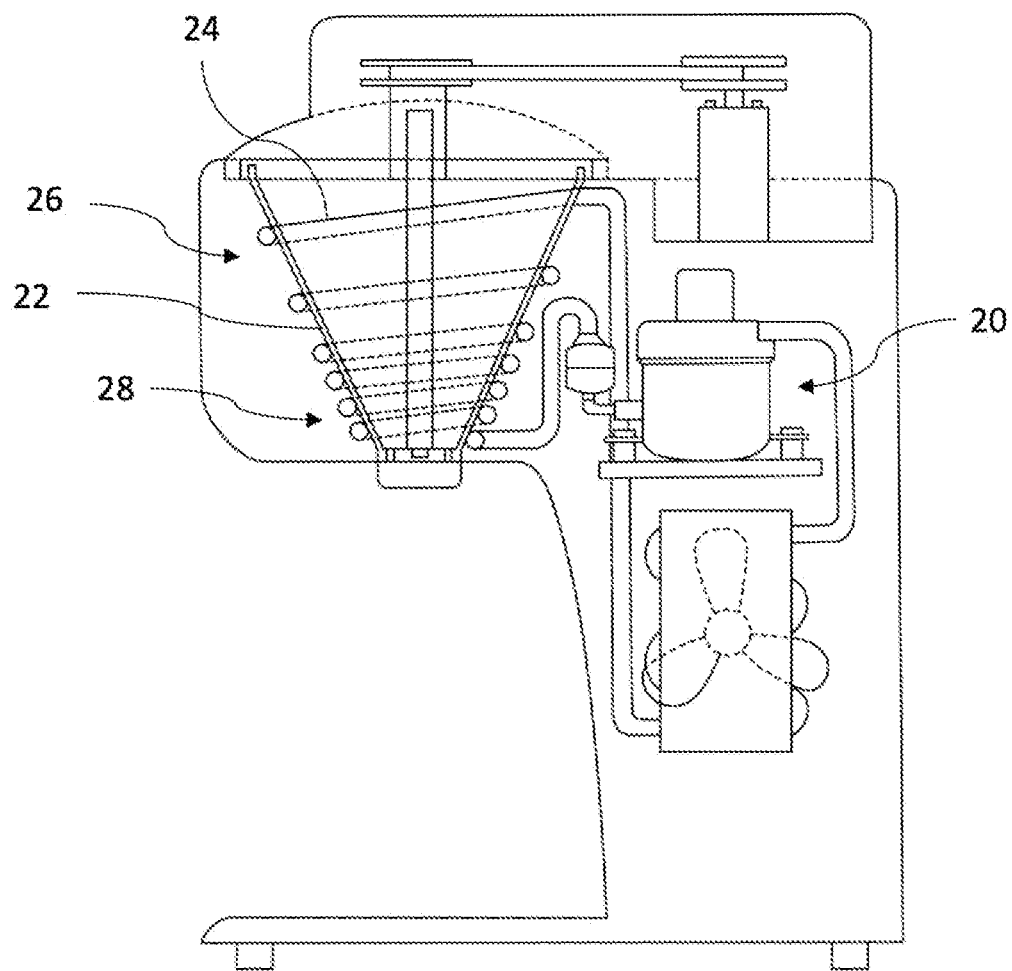
FIG. 2 shows cross-sectional side view of the apparatus in accordance with the present disclosure.
Figure 3:
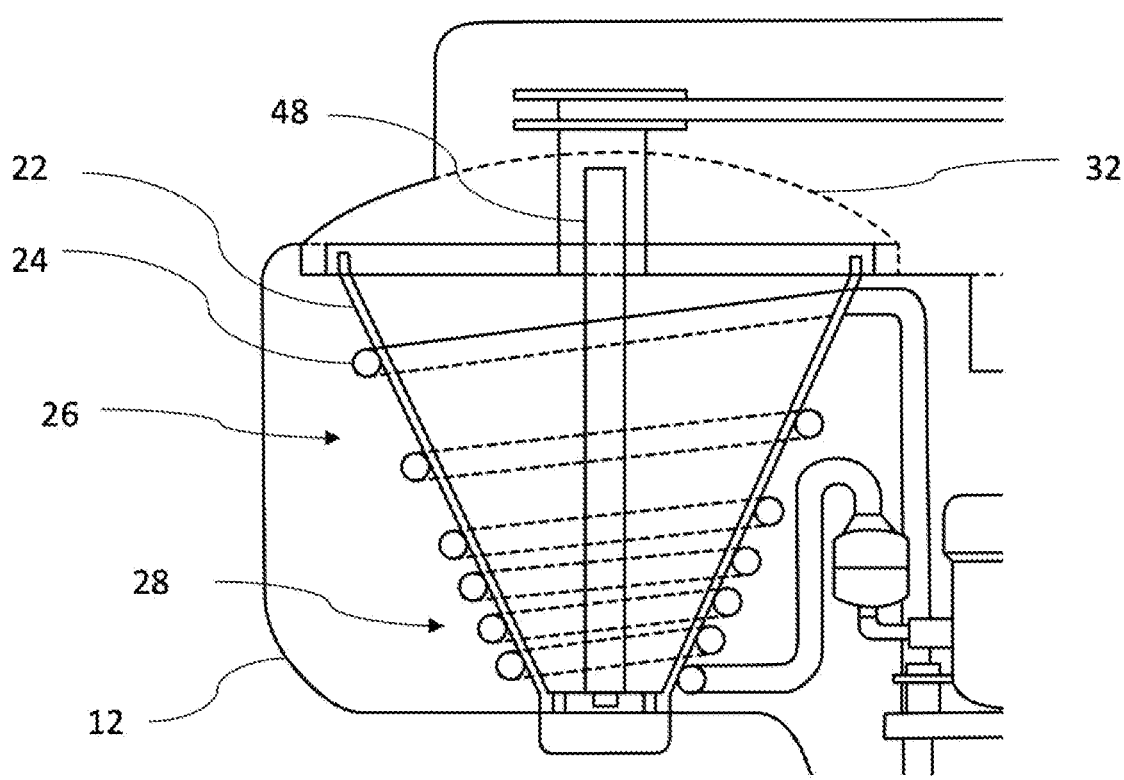
FIG. 3 shows a magnified cross-sectional side view of the lower end of the apparatus in accordance with the present disclosure.

With regard to FIG. 1, frozen product machine 10 has a housing 12, a base 18, a power supply 16 and a nozzle 14. FIGS. 2 and 3 show internal components inside housing 12 of frozen product machine 10. A conical cooling chamber 22 may be cooled by an outer cooling element. Cooling chamber 22 may be alternatively shaped as an urn or have a cylindrical upper section and a conical lower section. Cooling chamber 22 may be comprised of a material, which may be a thermally conductive metal, such as aluminum. Cooling chamber 22 may have a non-stick material on its inner surface that prevents sticking to ice cream as is known in the art. In one embodiment, a non-stick freezing surface for freezing a thin layer of liquid food product may include a thermally conductive platen having a smooth upper surface and a coating containing polytetraflouroethylene (PTFE) covering that surface as described in U.S. Pat. No. 6,745,595, the entire disclosure of which is hereby incorporated by reference. Preferably, the coating is of organic metal PTFE, or more preferably nickel-infused PTFE. In some embodiments, the non-stick surface may partially coat the chamber, such that portions of the cooling chamber or nozzle 14 that are not accessed by the auger 40 for scraping may be coated.

Cooling chamber 22 may be vertically positioned to allow a liquid product to be poured from a top opening in frozen product machine 10 and into cooling chamber 22 to be gravity directed to the bottom of cooling chamber 22. The top of frozen product machine 10 may open on a hinge, or accept fluid from a bottle or pod, to allow liquid product mix to flow into cooling chamber 22.

In some embodiments, cooling chamber 22 may be conical or cylindrical and vertically oriented. In some embodiments, cooling chamber 22 may be conical or cylindrical and horizontally oriented. In some embodiments, cooling chamber 22 may be partially conical and partially cylindrical, wherein cooling chamber 22 is cylindrical at an inlet portion of cooling chamber 22, and conical at an outlet portion of cooling chamber 22. In some embodiments, the cooling chamber may be positioned at an angle between 0 and 90 degrees to a horizontal plane at nozzle 14.

Figure 11:
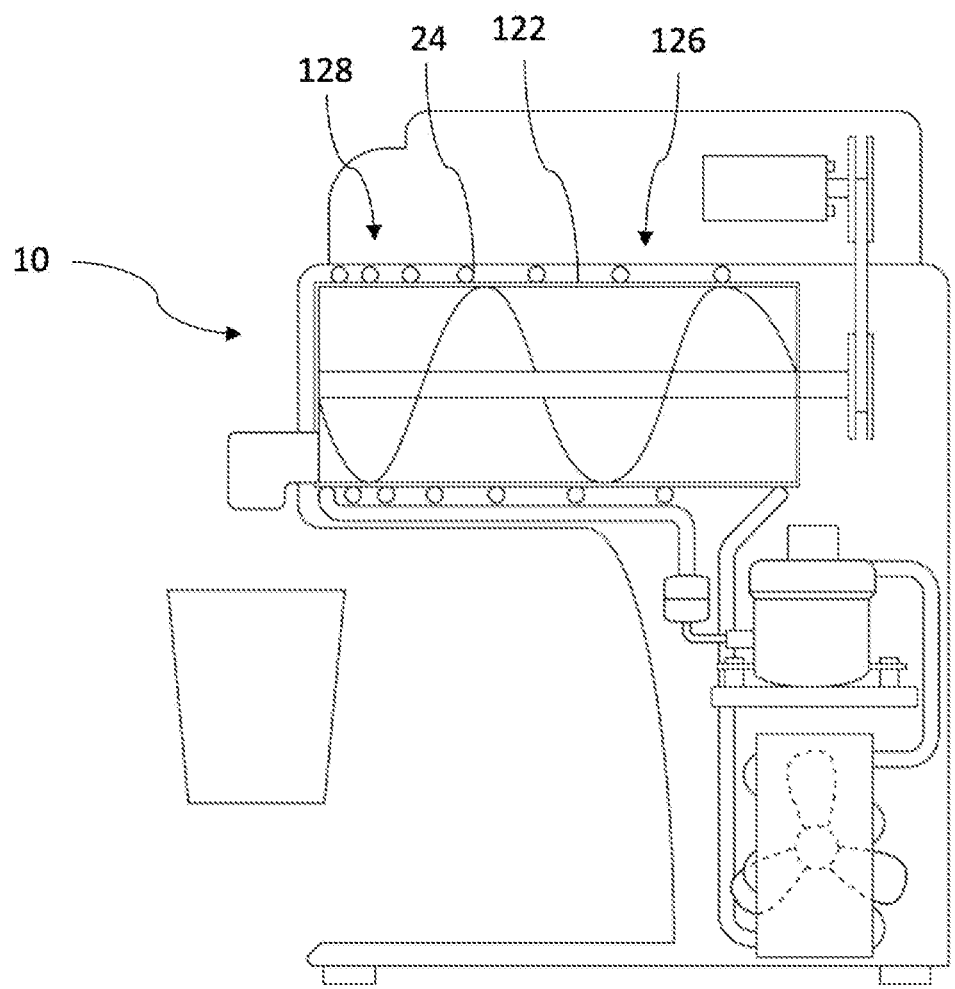
FIG. 11 shows a shows cross-sectional side view of the apparatus having a horizontal cylindrical cooling chamber in accordance with the present disclosure.

In an embodiment having a horizontally oriented cylindrical cooling chamber 22, coil density may be higher at an inlet portion of cooling chamber 22 and lower at an outlet, or nozzle 14, portion of cooling chamber 22. Nozzle 14 may be centrally positioned on cooling chamber 22, or, in some embodiments, particularly for a cylindrical, horizontal cooling chamber 22, nozzle 14 may be positioned on the bottom side of the outlet end of cooling chamber 22, as shown in FIG. 11.

Frozen product machine 10 may have a cap 32, as shown in FIG. 3, that covers cooling chamber 22. A directional locking design on cap 32 allows for a tight seal while mixing and cleaning, and allows for easy disassembly, which can be accomplished either by a motor driven mechanical lock, depending on the direction of rotation, or through a manual lock on the cap 32.

The cooling element may include a compressor and motor unit 20, and includes evaporator coil 24 having a higher coil density at lower cooling chamber 28, such that adjacent portions of evaporator coil 24 are spaced closer together and more compact, providing greater cooling capacity in this area. Lower cooling chamber 28 may also be referred to as a fast freezing zone. As shown in FIG. 3, the upper cooling chamber 26 has a lower density evaporator coil 24. This evaporator coil 24 creates a cooling gradient, with the highest cooling capacity at the lowest part of cooling chamber 22. Other means than evaporator coil 24 are contemplated within the scope of the present disclosure. Such means may include refrigerant passing through walls of chamber 22, wherein an inner wall and an outer wall of cooling chamber 22 would contain a refrigerant such as ammonia, or other cooling means, as would be known to one of ordinary skill in the art.

In some embodiments, evaporator coil 24 density may be higher in the upper chamber. In these embodiments evaporator coil 24 density surrounding the conical chamber would be reversed when compared to FIGS. 2 and 3, such that the coil density would be higher at the upper cooling chamber 26 and lower at the lower cooling chamber 28 toward nozzle 14. In other embodiments, evaporator 24 coil density may be higher in the upper cooling chamber 26 and lower cooling chamber 28, while the evaporator coil 24 density is lower in the central region of cooling chamber 22.

In one embodiment, the configuration of evaporator coil 24 results in a temperature gradient where cooling chamber 22 may be approximately 10° F. at the lower cooling chamber 28 wall and approximately 14°-18° at the top of the upper cooling chamber 26 at the chamber wall. In some embodiments, lower cooling chamber 28 may be approximately 0° F. at the chamber wall. These temperatures may vary depending on the parameters of the device and the settings of the device. The average temperature of the frozen product in cooling chamber 22 may, in some embodiments, be approximately 16°–18° F. The design of the cooling element according to the present disclosure results in a faster frozen product, such as frozen beverages or soft serve ice cream, allowing for rapid preparation time and single serving delivery.

Interior surfaces of chamber 22 may be cooled by intimate contact with evaporator coil 24 on outside surfaces, along with a high thermal transmission of the material comprising cooling chamber 22 and optimized compressor output. Cooling chamber 22 may be comprised of aluminum or other metal that allows for high thermal transmission, as would be known to one of ordinary skill in the art. The warming of the refrigerant as it passes through evaporator coil 24 may enhance the temperature gradient caused by evaporator coil 24 density. In one embodiment, refrigerant flows through evaporator coil 24 in an upward direction, such that the refrigerant enters the portion of evaporator coil 24 that is operatively connected to cooling chamber 22 at the lowest point of cooling chamber 22. The refrigerant may be a fluorocarbon, such as Freon® (R-12, R-13B1, R-22, R-410A, R-502, and R-503) or any other refrigerant capable of cooling chamber 22, as would be known to one of ordinary skill in the art.

In one embodiment of the present disclosure, cooling chamber 22 may have a 20 oz. capacity. In one embodiment, the height of cooling chamber 22 is 10.93186 cm and the diameter of the top and bottom may be 13 cm and 3 cm respectively. The thickness of cooling chamber 22 may be 0.25 cm and the bottom cylindrical portion may have a height of 0.5 cm. The pitch values may be 1.8586 cm, 2.62772 cm, and 6.44554 cm from top to bottom.

An auger 40, which may also be referred to as a scraper, in that the blades of auger 40 may scrape frozen product from the inner wall of cooling chamber 22, may be fit into cooling chamber 22 to mix and dispense the frozen product. Auger 40 may include between 1.5 and 6 revolutions of helical screw 41, where 3 or less revolutions is preferred.

The compressor may be a 168-watt compressor having an energy density of 8.4 watts per oz., which is equivalent to 0.005561 watts/sq. mm. The energy gradient may be 0.004176 watts/sq. mm at the top of chamber 22 and 0.006946 watts/sq. mm. at the bottom of chamber 22. The energy gradient ration (B/T) may be 1.66314. In one embodiment, the refrigerant cycle may be designed to achieve an evaporator coil 24 temperature of 16° F., with a low side pressure of 75.8 psi.

In some embodiments, the liquid product may be a pourable liquid that gravitationally flows to the fast freeze zone, or lower cooling chamber 28, of cooling chamber 22 where intense cooling quickly nucleates many small crystals within the product matrix.

Figure 4:
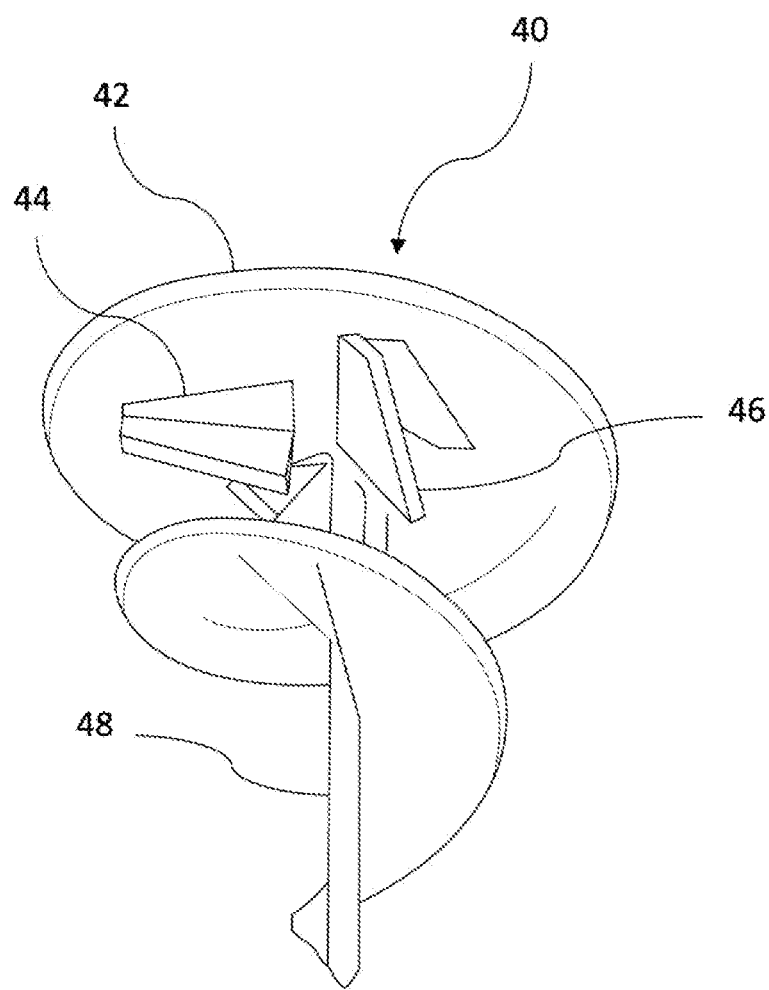
FIG. 4 shows a bottom perspective view of a slotted auger with fins in accordance with the present disclosure.

As shown in FIG. 4, within cooling chamber 22, an auger 40 serves to mix ice cream product and to scrape frozen ice cream product from the inner side of cooling chamber 22. Auger 40 may be comprised of soft silicone, so not to damage the walls of cooling chamber 22 through constant use, or aluminum, steel, plastic, or any other material capable of churning frozen liquid product. Auger 40 also serves to lift frozen product to the top of cooling chamber 22. Auger 40 may be driven by a 2-speed reversible motor that continuously lifts product up, against gravity, through the conical cooling chamber 22 and scrapes newly formed ice crystals from the inner surface of cooling chamber 22.

As small ice crystals nucleate and permeate the lower volume of cooling chamber 22, they are scraped from the sides of cooling chamber 22 and lifted by auger 40 as the freezing and mixing process is taking place. This mechanism directs the solid, frozen portions of the mix toward the top of cooling chamber 22 while the higher density, less viscous liquid flows down into lower cooling chamber 28 through slots 44, or apertures, in auger 40. While ice crystals are being formed lower cooling chamber 28 and lifted, ice crystals are also forming in upper cooling chamber 26. These ice crystals are also being removed from the inner surface of cooling chamber 22 by auger 40.

As shown in FIGS. 4-8, auger 40 may have a variety of designs that accomplish the functions of lifting the frozen product while allowing a flow of liquid product to lower cooling chamber 28. The angle of the conical cooling chamber 22, the cooling capacity gradient, the rotational frequency of auger 40, the structure of auger 40, and the liquid product formulation dictate optimal parameters for product quality and efficiency of production.

FIG. 4 shows a bottom perspective view of an auger 40 having a helical screw shape. Helical screw auger 41 has a shaft 48 and rotatable, directional hinged fins 46 on the upper one and a half turns of auger 40. Shaft 48 of auger 40 is connected to motor and compressor unit 20 which directs rotation of auger 40 to mix and dispense the product. In some embodiments shaft 48 may be integral with auger 40, while in other embodiments shaft 48 may detachably connect to auger 40. Helical screw blade 42 is shown at the outer edge. In this view, hinged fins 46 are shown in an open position. In this embodiment, the upper portion of auger 40 includes slots 44 to facilitate product mixing and to allow the liquid product to flow to lower cooling chamber 28. By adjusting the helical periodicity (variable pitch from top to bottom) of the screw, or the number hinged fins 46 and slots 44, residence time on the inner freezing surface of cooling chamber 22 can be adjusted for optimal ice crystal formation.

As shown in FIG. 4, hinged fins 46 may be directional, such that while frozen product machine 10 is in mixing mode where the rotation of auger 40 directs the frozen product upwards, hinged fins 46 may be in an open position. When frozen product machine 10 is in dispensing mode, the hinged fins 46 may be in a closed position. The rotation of auger 40 while frozen product machine 10 is in dispensing mode causes a flow of frozen product downward toward nozzle 14. While in dispensing mode, the frozen product flow direction places an upward pressure on hinged fins 46, thereby helping to maintain hinged fins 46 in a closed position during dispensing, wherein slot 44 is closed. Closure of slot 44 during dispensing may be important to allow effective flow of frozen product from upper cooling chamber 26 to lower cooling chamber 28 and, ultimately, to nozzle 14 for dispensing.

Hinged fins 46 may have a hinge mechanism that allows for rotation from an open to a closed position in slot 44. In one embodiment, the hinge may be comprised of a flexible material that allows for rotation of hinged fin 46, such as a living hinge. Other hinge means may include a pin placed through the fin and auger 40 that allows for rotation about an axis. In one embodiment the hinge, which may be a barrel hinge, allows for free rotation such that when in the open position during mixing hinged fin 46 may rotate 180 degrees, where rotation may be stopped during mixing by contact with auger 40. This design would prevent damage to the hinge caused by pressure on a hinge that stopped rotation at 90 degrees or less. Pressure on the hinge during mixing could result from a flow of product against the hinge or rotational forces against the hinge. Additional types of hinges contemplated within the scope of the present disclosure includes a strap hinge, a butt hinge, a spring loaded hinge, a concealed hinge, a piano hinge, an overlay hinge, a hidden barrel hinge and a gate hinge and other hinge types as would be known to one of ordinary skill in the art. In some embodiments, hinges may be self-closing.

In some embodiments, a sliding fin may be used in place of hinged fin 46 to close slots 44 during dispensing. In this embodiment, the rotation of auger 40 may cause the sliding fin to open during mixing and close during dispensing. The sliding fin would then recede into a horizontal gap in auger 40 during mixing and extend out to cover slot 44 during dispensing.

Figure 5:
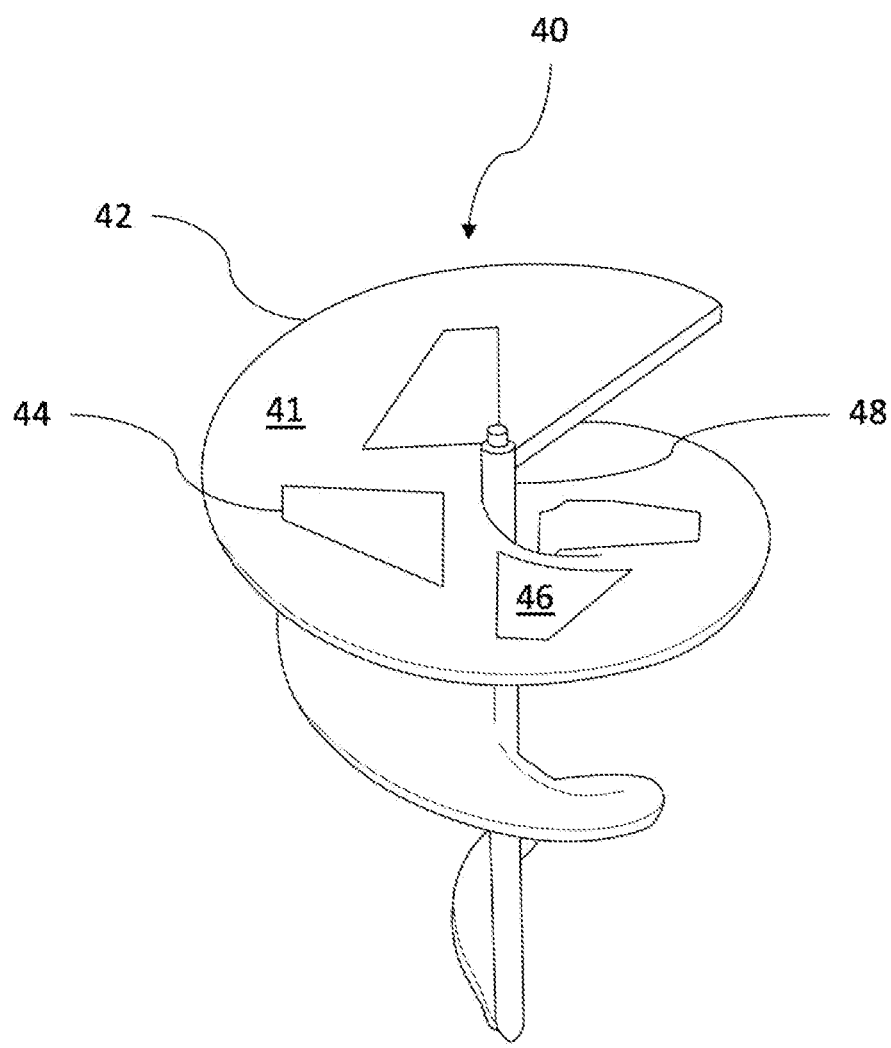
FIG. 5 shows a top perspective view of a slotted auger with fins in accordance with the present disclosure.
Figure 6:
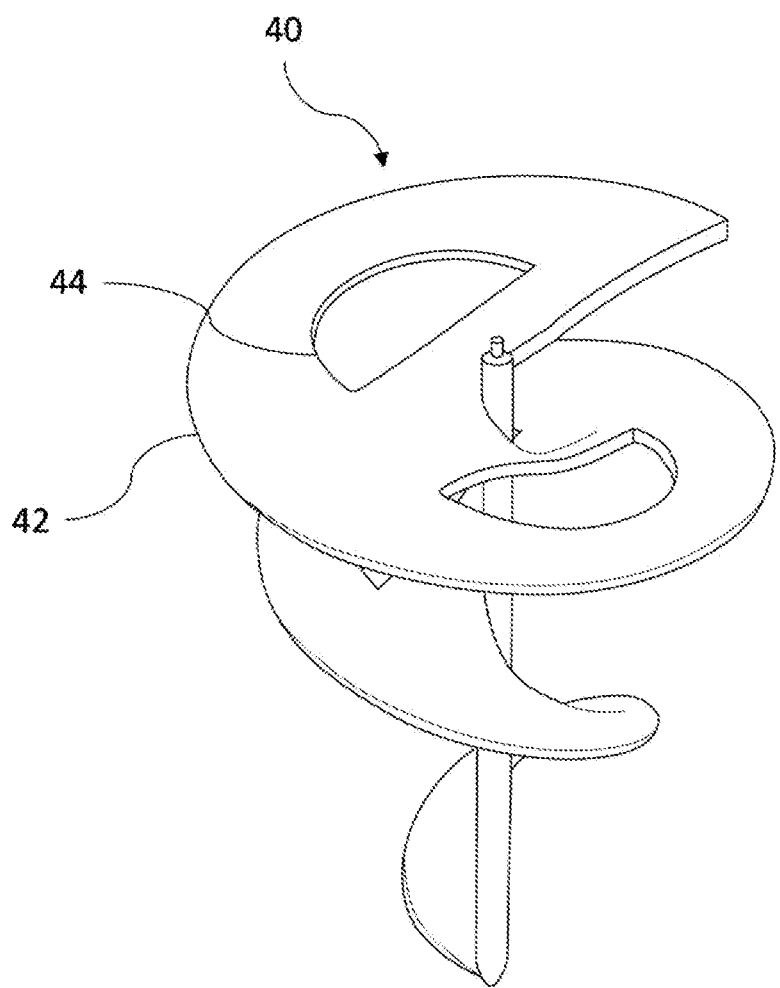
FIG. 6 shows a top perspective view of a slotted auger in accordance with the present disclosure.
Figure 7:
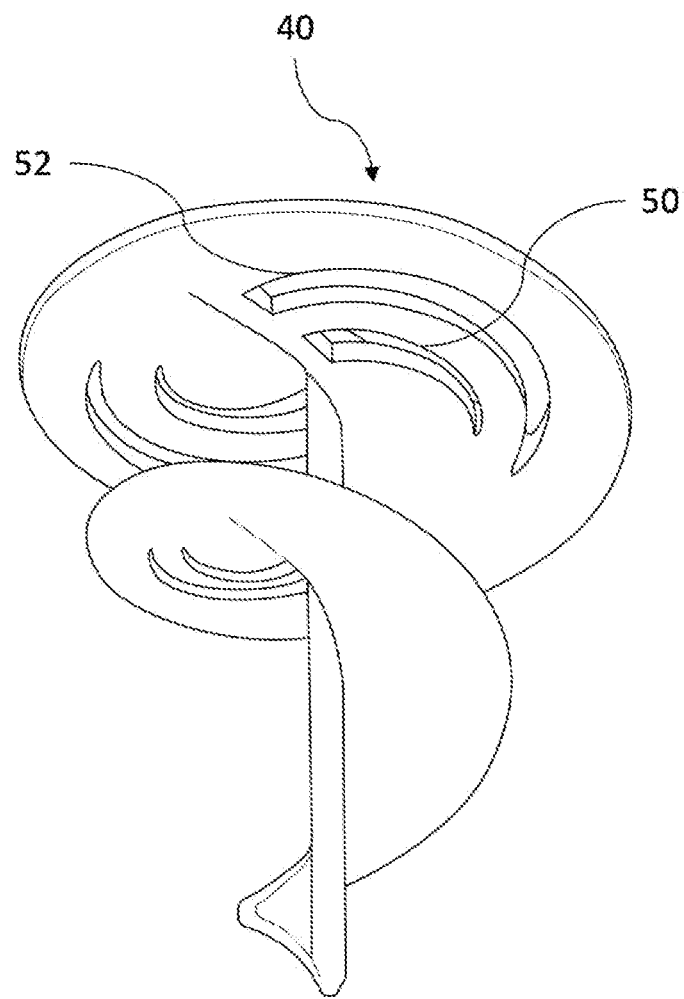
FIG. 7 shows a bottom perspective view of a slotted auger in accordance with the present disclosure.

FIG. 5 shows a top perspective view of auger 40 where hinged fins 46 are in a closed position. FIG. 6 shows an auger 40 having slots 44, but no hinged fins 46. FIG. 7 shows an auger 40 having an inner helical slot 50 and an outer helical slot 52.

Figure 8:
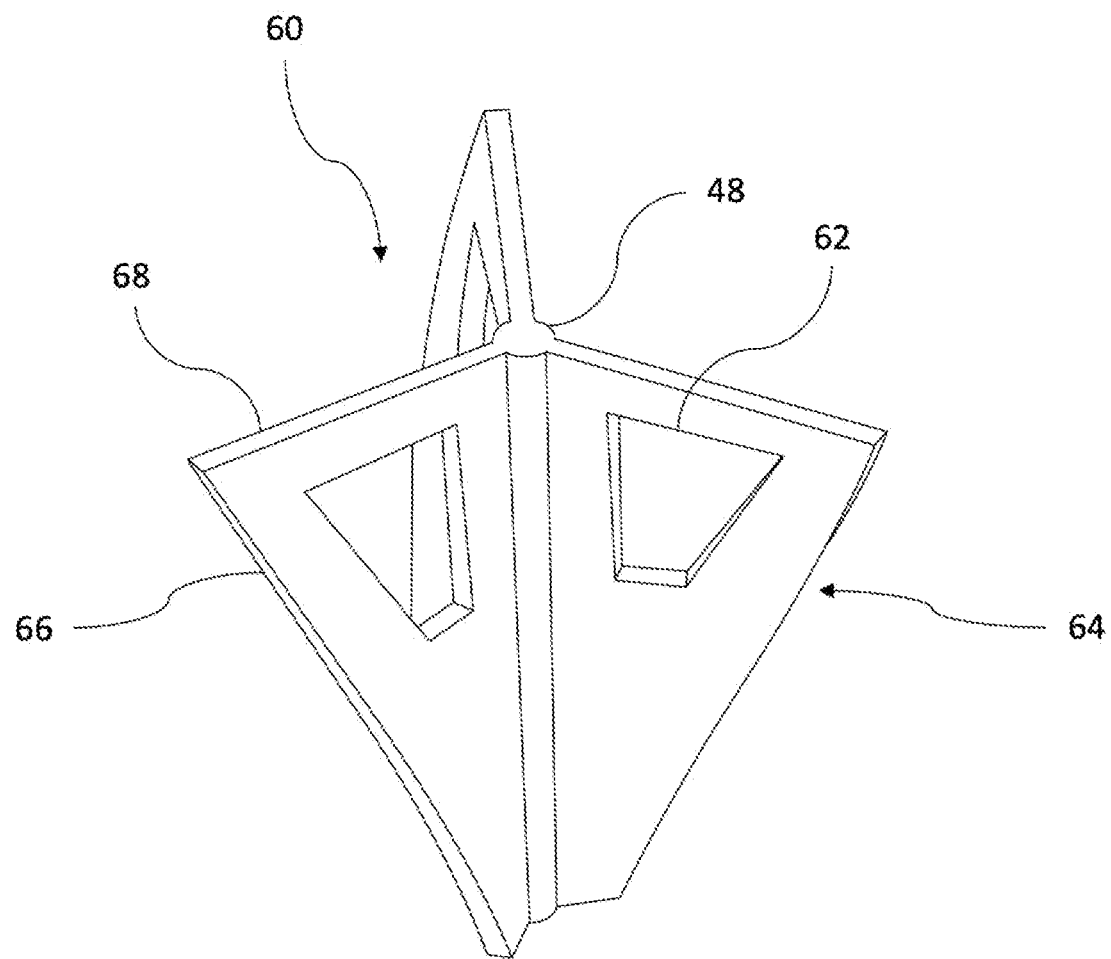
FIG. 8 shows a top perspective view of a vortex auger in accordance with the present disclosure.
Figure 9:
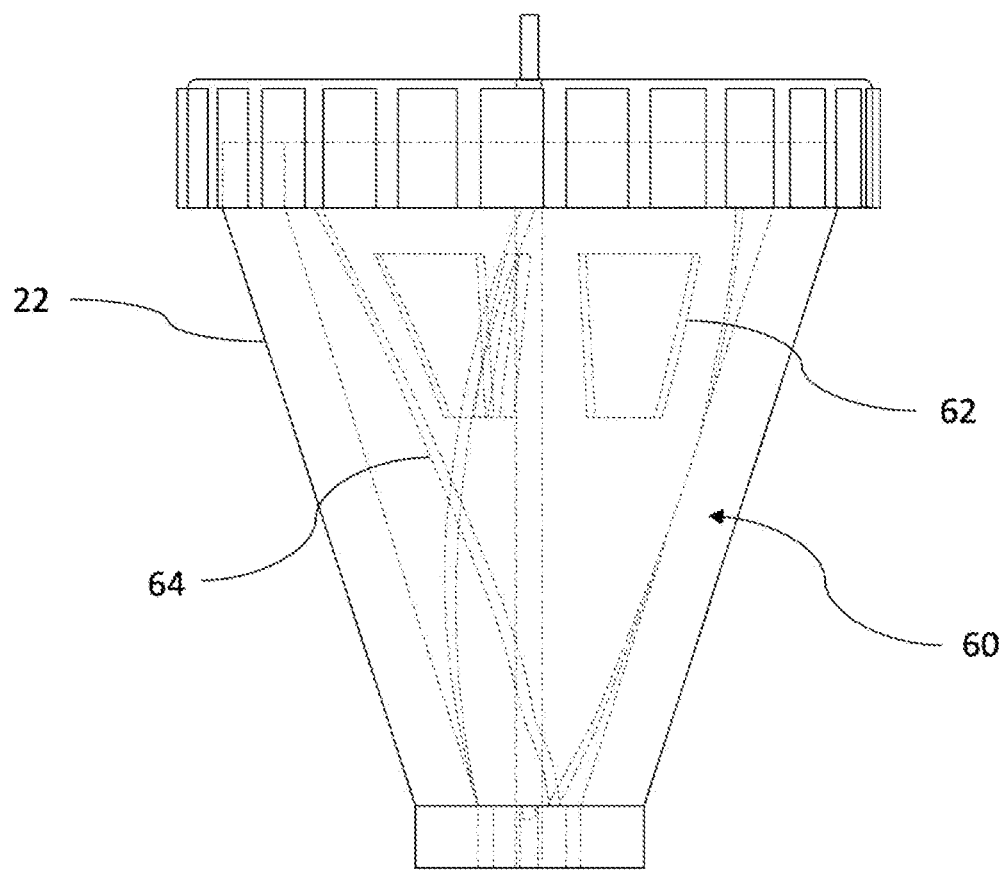
FIG. 9 shows a side view of a vortex auger in a conical cooling chamber in accordance with the present disclosure.
Figure 10:
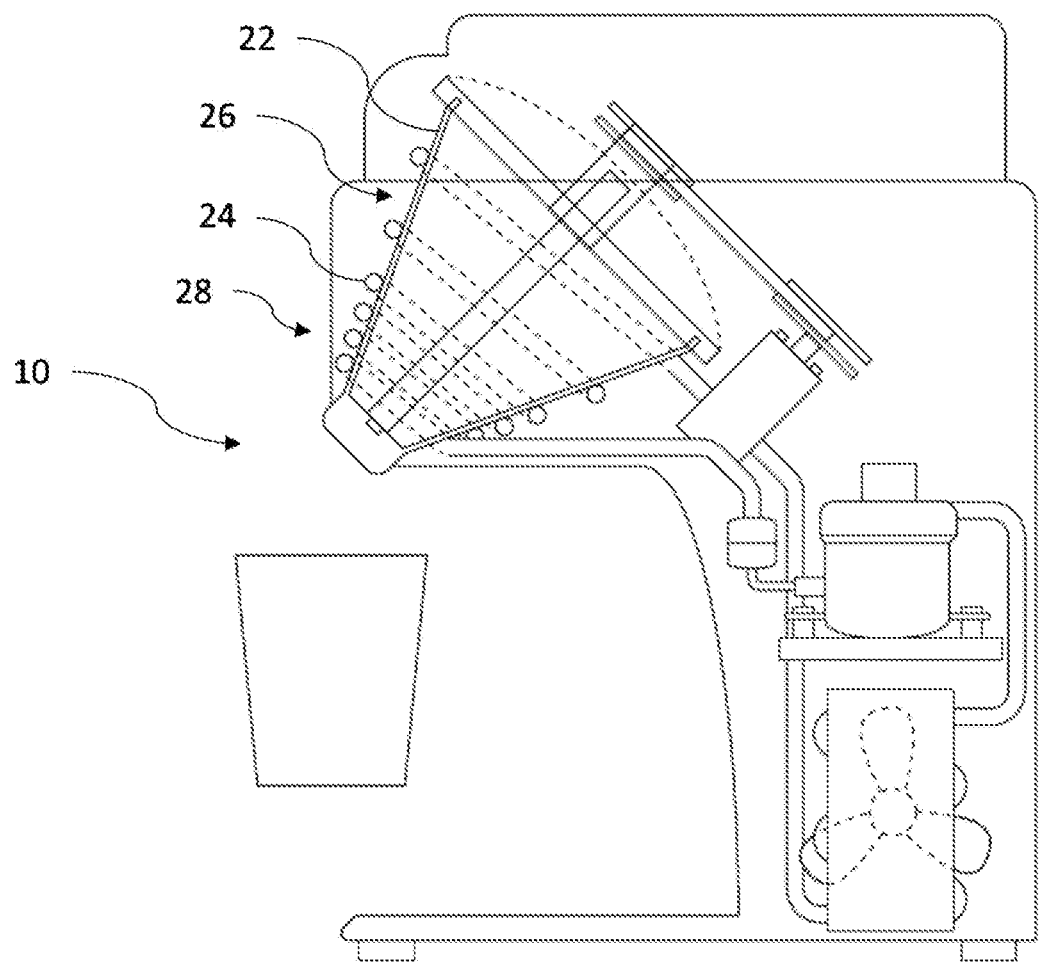
FIG. 10 shows a shows cross-sectional side view of the apparatus having an angled conical cooling chamber in accordance with the present disclosure.

FIGS. 8 and 9 show one embodiment of the present disclosure that includes an angled multi-panel structure designed to create a vortex mixing effect. FIG. 9 shows a vortex auger 60, which is designed to create a vortex in cooling chamber 22 to enhance mixing and cooling. Vortex auger 60 may have between 1/16 and 1/3 revolutions per blade. Vortex auger 60 is designed to lift and mix the liquid product in cooling chamber 22 and may include a vortex auger window 62 within vortex auger panel 64. Vortex auger panel 64 may have a lower blade 66 and an upper blade 68. Vortex auger 60 has a plurality of vortex auger panel 64, wherein each vortex auger panel 64 may be independent from other vortex auger panels 64 and connected centrally along shaft 48. Vortex auger panels 64 may be generally planar, with some curvature, and may have a vortex auger window 62 in the upper portion of the vortex auger 60. Vortex auger panel 64 may have a curvature that is greater towards the outer portion of vortex auger panel 64. In some embodiments, a single vortex auger panel 64 may be used to reduce surface area on which frozen product could accumulate.

With regard to auger speed, in one embodiment of the present disclosure that includes an auger 40 having a helical screw 41, the auger dispensing mode speed may be 69.697 rpm. The speed multiplier may be 1.5. The auger mixing and cleaning mode speed may be 104.545 rpm. The auger tip speed for mixing may be 711.618 mm/sec at the top of cooling chamber 22 and 164.219 mm/sec at the bottom of cooling chamber 22; while auger tip speed for dispensing may be 474.412 mm/sec at the top of cooling chamber 22 and 109.480 mm/sec at the bottom of cooling chamber 22.

In one embodiment, once frozen product reaches the apex of the lift cycle by auger 40, it may flow back into the center of the conical cooling chamber 22 to be cycled up again from lower cooling chamber 28. This is facilitated by hinged fins 46, slots 44, which may also be referred to as windows, cut-openings or gaps, incorporated into auger 40 design, in conjunction with gravity. The separation of the product by density and state of matter directs the liquid product to the highest cooling capacity area of the machine, which is lower cooling chamber 28.

Once the frozen product, which may be an ice cream or smoothie mix, reaches the desired temperature or consistency or hardness, as measured by a temperature sensor or torque sensor, the direction of auger 40 may be reversed by the motor.

For measuring hardness or consistency of the frozen product, in one embodiment, a sensor module monitors input power of a motor driving the one or more rotatable auger 40 for detecting the hardness measure of the frozen product. One way to determine hardness of the frozen product is to monitor the speed of the motor shaft or the auger 40 while driving the motor under a constant torque. Different hardness levels of frozen product produce different loads on auger 40. Therefore, if the motor runs at constant torque, the motor speed will change according to the load on shaft 48. Once the frozen product gets harder, load on the motor will increase. Using this method, a speed sensor on the motor shaft may be used to predict when the frozen product has reached the desired hardness by measuring the drop in motor shaft speed throughout operation.

In one embodiment, the microprocessor (or MCU) senses that the motor has slowed down and in response, turns off the compressor to pause cooling. As the frozen product melts, momentarily (either a timed interval or interval or using an algorithm based on temperature/time and its rate of change) the MCU can deliver power back to the motor and sense feedback from the speed sensor. If the frozen product is still too hard, the computer would register a low rpm reading and continue to wait until a pre-determined rpm is able to be achieved by the motor. In tandem, the compressor could also be instructed to start up to resume cooling or freezing after a certain rpm is achieved by the motor. Other methods of measuring hardness through monitoring input power of a motor may be used as would be known to one of ordinary skill in the art.

A second method to determine hardness is to measure the motor output torque, (or input voltage, current driving frequency or input power) while maintaining a constant speed of the motor or auger 40. As the frozen product gets harder, load on the blades (or motor) will be increased. Motor torque can be related to the input power, driving frequency, current or the input voltage which is dependent on the motor type. Therefore, while maintaining a constant speed of the motor or the mixing blades, it is possible to detect hardness levels by monitoring motor input power, current, voltage or driving frequency. Other methods of measuring hardness by monitoring the motor output torque may be used as would be known to one of ordinary skill in the art.

There are several exemplary methods of measure the motor speed including use of Hall Effect sensor or magnet sensor, use of pulse counter disk with, for example, infrared or photo diode receiver/transmitter, and back electromotive force (EMF) measurements from the motor.

There are several methods for regulating the motor speed. The device can regulate the motor input voltage, current, driving frequency or pulse width modulation based on the speed measured from the motor. One or more of these methods can be applied, based on the motor type used in the system. Other methods for regulating motor speed may be used as would be known to one of ordinary skill in the art.

In one embodiment, the motor provides rotating power to the auger. The compressor works in conjunction with evaporator coil 24 that surrounds the cooling chamber 22. The speed of the motor is detected by a sensor. The sensor may take any one of a number of forms. In some embodiments, the real time input power to the motor is detected or sensed whereupon this input power data is supplied to and used by a microcontroller unit (MCU). The MCU uses the input power data to operate a regulator that works to maintain a constant motor speed or a constant motor power or to operate a switch that turns the motor on and off. To the extent that algorithms or additional processing are required to interpret power of motor speed data, a separate module or processor communicates bi-directionally with the MCU. The MCU also cooperates with the user interface so as to provide information signals to the display and to interpret inputs from the user controls.

While the system continues this process, the MCU monitors the real time input voltage of the motor and calculates the voltage difference compared to initial startup voltage. As the liquid product of ingredients gets harder, the driving voltage of the motor will increase as the motor requires a higher torque to maintain the speed. Thus, the input voltage difference over time indicates the hardness levels of the frozen product mixture.

Hardness levels can also be detected by monitoring the rate of change of input voltage or rate of change of the rate of change.

By interpreting this information, the frozen product machine 10 can be programmed to stop or reverse direction when it reaches the desired or selected hardness level.

A hardness sensor is one solution for determining when a desired hardness level has been achieved, as it is a fairly direct measurement of the end consistency. Thus, the aforementioned variables that may affect the time required to produce the frozen product need not be considered.

Another method to determine the length of processing required to produce the desired frozen product consistency or hardness may be with the incorporation of a temperature sensor. A temperature probe may be useful in determining temperature of the liquid product and determining length of processing time.

One method is the detection of the initial temperature of the liquid product. This information can be used to determine or predict the time required for making frozen product of a given hardness. For example, if the ingredients have been heated up, the detection of elevated temperature in the liquid product will cause the MCU to alter the timer to increase the mixing time by a fixed amount, say 10 minutes. Conversely, if the temperature of the ingredients suggests the liquid product has been chilled, then the timer will automatically deduct a time, e.g. 10 minutes from the process duration.

The hardness of the liquid product may be proportional to the temperature. Usually the harder the liquid product, the lower the temperature. This can then be used to determine, by inference, when the frozen product has reached a certain consistency. One location for a temperature probe is on an upper surface of the cooling chamber 22 or cap 32, to be directly immersed into the frozen product mixture. The temperature probe can be connected using a flying lead and jack configuration. In this embodiment, a clip element removably couples the temperature probe within the frozen product vessel while measuring the temperature of the ingredient mix. It will be appreciated that the flying lead can then be coupled to the apparatus via an electrical jack.

In another embodiment the temperature sensor may be in the form of a radio-frequency identification (RFID) temperature transponder. This RFID temperature transponder is typically insert molded into the auger 40. This temperature sensor can measure the temperature of the ingredient mix and relay a temperature signal back to an RFID receiver element, typically located within the frozen product maker. It would be appreciated that this method does not require any physical connection between the receiver and transponder. The RFID receiver receives temperature data from the transponder and also acts as a remote power source for the transponder. The RFID receiving is coupled to the processor module. Other methods of measuring temperature to control rotation of auger 40 may be used as would be known to one of ordinary skill in the art.

While the present invention has been disclosed with reference to particular details of construction, these should be understood as having been provided by way of example and not as limitations to the scope or spirit of the invention. To the extent that the frozen product maker of the present invention requires variable speed motor operation or any form of motor speed or motor position monitoring, this can be achieved by way of a hall sensor working in conjunction with a hall transducer located on a motor output shaft (or other portion of a power train). Another method of monitoring motor output shaft speed or position is the use of a counter disk, as is well known in the art.

Reversing the direction of auger 40 causes frozen product machine 10 to shift from mixing mode to dispensing mode. While a higher speed of auger 40 rotation may be used for mixing, a lower speed of rotation is desirable for compressing and dispensing the product through a traditional soft serve ice cream die to create an at-home soft serve ice cream experience. Variable pitch design for auger 40 and hinged fins 46 may facilitate dispensing of the product with optimal consistency and quality at a high efficiency with a minimal residual product left in cooling chamber 22.

In one embodiment, after the frozen ice cream product is dispensed, frozen product machine 10 may be powered off to allow cooling chamber 22 to defrost. A rigorous self-cleaning and sanitizing cycle can be accomplished by adding a cleaning and sanitizing solution to cooling chamber 22 and running a cleaning cycle in mixing mode. Once a cleaning cycle is complete, the cleaning solution may be dispensed through nozzle 14.

In one embodiment, shown in FIGS. 2 and 3, the temperature differential in the chamber may result in a less viscous, less sticky, and more flowable frozen product at the higher temperature of upper cooling chamber 26 and a more viscous lower temperature frozen product in lower cooling chamber 28, thus promoting faster dispensing. One embodiment may include multiple modes, where frozen product machine 10 has cooling and mixing mode, followed by a cooling mode, followed by a dispensing mode. Dispensing mode and cooling mode would both have the same rotational direction for auger 40.

In one embodiment, a microprocessor (or MCU) based frozen product machine 10 includes an electronic display and various user controls. The controls are used to operate the machine, to input preferences and to select options that may appear on the display. The interior of the housing 12 may contain a compressor and its fan, a motor for driving the rotating auger 40 and a sub-housing for containing electronic components, the microprocessor unit, and other components as required.

Having described embodiments of the present disclosure, it is to be understood that the invention may otherwise be embodied within the scope of the appended claims. Although the disclosure has been described with reference to certain preferred embodiments, it will be appreciated by those skilled in the art that modifications and variations may be made without departing from the spirit and scope of the disclosure. It should be understood that applicant does not intend to be limited to the particular details described above and illustrated in the accompanying drawings.

What is claimed is:

1. An apparatus, comprising:
   a chamber for receiving a material;
   an auger adapted to fit within the chamber;
   the auger connected to a motor for rotating the auger;
   wherein the motor has a mixing motor setting and a dispensing motor setting;
   wherein the mixing motor setting causes the auger to rotate in a first direction;
   wherein the dispensing motor setting causes the auger to rotate in a second direction;
   wherein the first direction is substantially opposite to the second direction;
   wherein the auger includes at least one slot and at least one fin;
   wherein the at least one fin has a substantially open position to promote a flow of the material through the at least one slot, and a substantially closed position to inhibit a flow of the material through the at least one slot; and
   wherein the at least one fin is in the substantially open position during mixing and in the substantially closed position during dispensing of a product.

2. The apparatus of claim 1, wherein the chamber has an inlet, an outlet, and a nozzle for dispensing the product.

3. The apparatus of claim 1, wherein the auger and the chamber are supported by a housing.

4. The apparatus of claim 1, wherein the at least one fin is attached adjacent to the at least one slot.

5. The apparatus of claim 1, wherein the motor is reversible.

6. The apparatus of claim 1, wherein the chamber is conical and vertically oriented.

7. The apparatus of claim 1, wherein the chamber has a temperature sensor coupled to the motor such that a direction of the motor is reversed when a pre-set temperature is reached, causing the auger to change from the first direction to the second direction.

8. The apparatus of claim 1, wherein the at least one fin is an at least one hinged fin.

9. The apparatus of claim 1, further comprising a cooling element adapted to cool a cooling chamber.

10. The apparatus of claim 9, wherein the cooling element includes a compressor and motor unit; and
    wherein the compressor and motor unit includes an evaporator coil for cooling the cooling chamber.

11. The apparatus of claim 10, wherein the evaporator coil has an evaporator coil density that is greater at a designated portion of the cooling chamber.

12. A method, comprising:
    adding a material into a chamber;
    mixing the material in the chamber by rotating an auger in a first direction,
    wherein the auger has at least one slot and at least one fin;
    wherein the at least one fin is in a substantially open position during mixing;
    dispensing the material by rotating the auger in a second direction, wherein the second direction is substantially opposite to the first direction;
    changing a position of the at least one fin from the substantially open position to a substantially closed position during dispensing to inhibit a flow of the material through the at least one slot in order to promote dispensing.

13. The method of claim 12, wherein the chamber has an inlet, an outlet and a nozzle.

14. The method of claim 12, wherein the at least one fin is attached adjacent to the at least one slot.

15. The method of claim 12, further comprising changing a setting on a motor to rotate the auger in the second direction.

16. The method of claim 12, further comprising a cooling element for cooling the material in the chamber.

17. The method of claim 16, wherein the cooling element includes a compressor and motor unit; and
    wherein the compressor and motor unit includes an evaporator coil for cooling the chamber.

18. The method of claim 17, wherein the evaporator coil has an evaporator coil density that is greater at a designated portion of the cooling chamber.

19. A method, comprising:
    adding a material into a chamber,
    wherein the chamber includes an auger having at least one slot and at least one fin;
    substantially opening the at least one slot and mixing the material in the chamber by rotating an auger in a first direction; and
    substantially closing the at least one slot and dispensing the material by rotating the auger in a second direction.

\* \* \* \* \*